US012228225B2

(12) United States Patent
Zhong (10) Patent No.: US 12,228,225 B2
(45) Date of Patent: Feb. 18, 2025

(54) ADDITIVE MANUFACTURED ASSEMBLY-FREE TOOL FOR VEHICLE GEARBOX MAINTENANCE (71) Applicant: VOLVO TRUCK CORPORATION, Gothenburg (SE)

(72) Inventor: Yuan Zhong, Danderyd (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 4 days.

(21) Appl. No.: 18/181,251

(22) Filed: Mar. 9, 2023

(65) Prior Publication Data
US 2023/0313921 A1 Oct. 5, 2023

(30) Foreign Application Priority Data
Apr. 4, 2022 (EP) .................................... 22166489

(51) Int. Cl.
*F16L 21/00* (2006.01)
*B33Y 80/00* (2015.01)
*B60S 5/00* (2006.01)
*B33Y 10/00* (2015.01)

(52) U.S. Cl.
CPC ............. *F16L 21/002* (2013.01); *B33Y 80/00* (2014.12); *B60S 5/00* (2013.01); *B33Y 10/00* (2014.12)

(58) Field of Classification Search
CPC ....... F16L 21/02; F16L 19/025; F16L 19/028; F16L 19/0283; F16L 19/0286; B33Y 10/00; B33Y 80/00
See application file for complete search history.

(56) References Cited

U.S. PATENT DOCUMENTS

| 173,239 | A | * | 2/1876 | Rice | F16L 19/025 |
| | | | | | 285/392 |
| 3,218,096 | A | * | 11/1965 | Press | F16L 19/025 |
| | | | | | 285/332.1 |
| 3,972,547 | A | * | 8/1976 | Itoya | F16L 41/10 |
| | | | | | 285/341 |
| 4,452,473 | A | * | 6/1984 | Ruschke | A61M 39/10 |
| | | | | | 604/905 |
| 5,376,015 | A | * | 12/1994 | Fuchs | H01H 1/5866 |
| | | | | | 439/321 |
| 5,413,147 | A | | 5/1995 | Moreiras et al. | |
| 6,581,593 | B1 | * | 6/2003 | Rubin | F16L 19/028 |
| | | | | | 128/911 |
| 7,156,424 | B2 | * | 1/2007 | McCord | F16L 19/005 |
| | | | | | 411/329 |

(Continued)

OTHER PUBLICATIONS

Extended European Search Report in corresponding European Application No. 22166489.9 dated Sep. 21, 2022 (8 pages).

*Primary Examiner* — David Bochna
(74) *Attorney, Agent, or Firm* — Venable LLP; Jeffri A. Kaminski (57) ABSTRACT

A nipple-shaped assembly-free tool for maintenance of a gearbox in a vehicle is described. The tool comprises a tubular body extending in an axial direction and having a first portion and a second portion; and a cap nut surrounding the first portion of the tubular body. The cap nut is rotatable and axially translatable in relation to the tubular body. The tubular body comprises a hose fitting structure at the second portion of the tubular body. The cap nut and the tubular body are retained as one unit such that they are non-detachable from each other.

13 Claims, 5 Drawing Sheets

(56) References Cited

U.S. PATENT DOCUMENTS

| | | | | |
|---|---|---|---|---|
| 8,672,366 B2* | 3/2014 | Mogedal | ............... | F16L 19/025 |
| | | | | 285/323 |
| 10,144,119 B2* | 12/2018 | Hylbert | ................. | F16L 19/025 |
| 2008/0061555 A1* | 3/2008 | Knight | .................. | F16L 19/028 |
| | | | | 72/370.11 |
| 2018/0216763 A1 | 8/2018 | Ranaware et al. | | |
| 2019/0249926 A1 | 8/2019 | Harris | | |

* cited by examiner

ADDITIVE MANUFACTURED ASSEMBLY-FREE TOOL FOR VEHICLE GEARBOX MAINTENANCE

TECHNICAL FIELD

The disclosure relates to a nipple-shaped additive manufactured assembly-free tool for maintenance of a gearbox in a vehicle.

BACKGROUND

Figure 1:
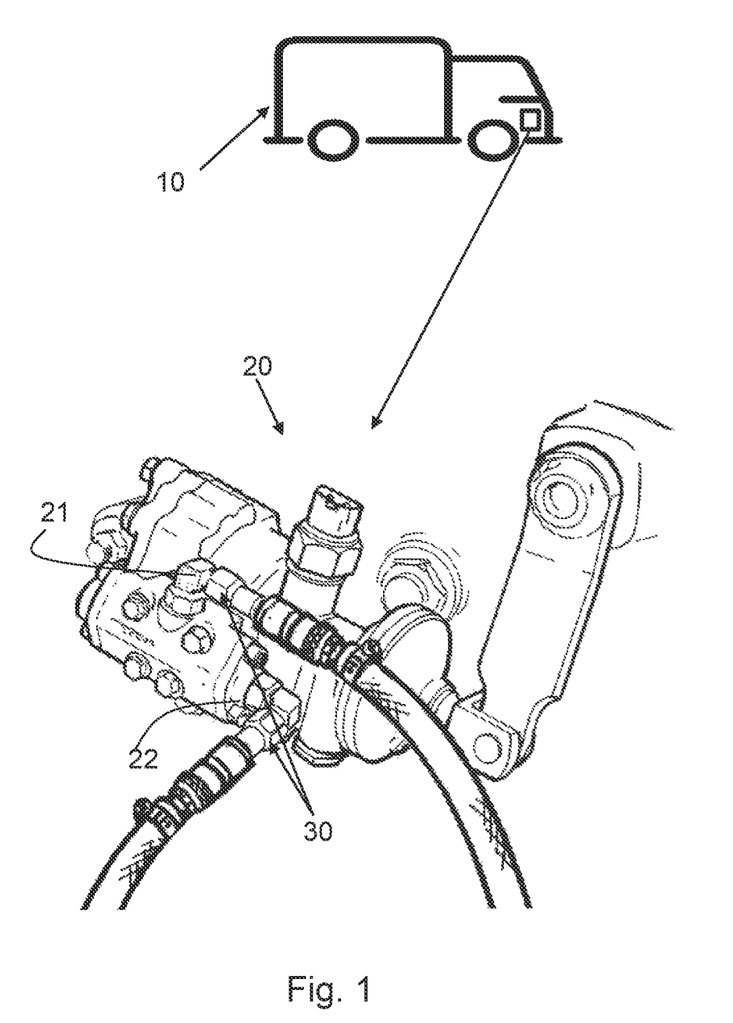
FIG. 1 is a schematic diagram showing a vehicle and a gearbox in which a special tool is used during maintenance.

A special tool called "nipple" is used in maintenance of gearboxes in heavy duty trucks e.g. for adjusting range cylinder and replacing pressure control relay valve. FIG. 1 shows a vehicle 10 and a gearbox 20 of the vehicle, where an air supply is connected to the cylinder 21 and the relay valve 22 using the special tool 30. This tool is supposed to withstand 8 bar pressure during operation. During the range cylinder adjusting operation, the range cylinder cover and shims are removed. The air connection is removed and the special tool 30 is fitted using a suitable union. Then the plunger is pushed to its high range using compressed air. During replacing pressure control relay valve operation, the front, straight connection on the relay valve is replaced with elbow union, then the special tool is fitted to the elbow union.

Figure 2:
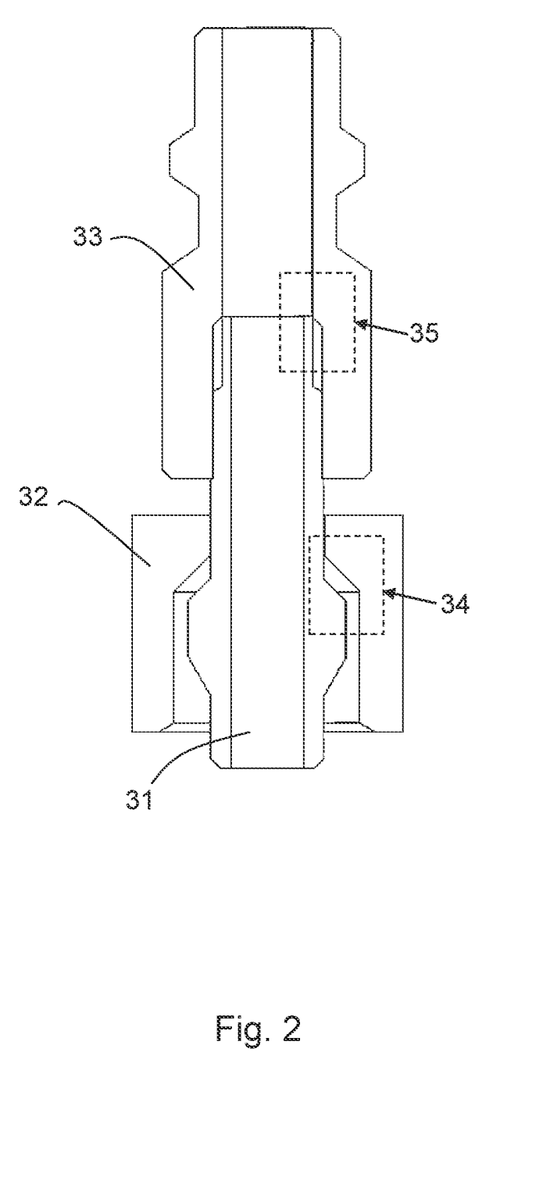
FIG. 2 is a cross-section view of the original special tool, FIG. 3 (a) is a perspective view of a tool according to embodiments herein, (b) is a cross-section view of the tool, (c) is an enlarge view of an inside part of the tool.

FIG. 2 shows a cross-section view of the tool 30. The tool 30 comprises three parts, a first part 31, a second part 32, a third part 33. The assembly process is, firstly the second part 32 should be fitted into the first part 31. Secondly the third part 33 should be screwed in the first part 31. The assembly process is therefore complicated and time-consuming which lead to longer maintenance time. Further, the tool 30 has a frequent leaking place 34 due to short contact area of the first and second parts after tightening and a change in inner diameter at a contact place 35 of the first and third parts due to the assembly of the first and third parts which disturbs the air flow during operation when the tool 30 is in use.

SUMMARY

An object of the disclosure is therefore to provide a tool with improved performance and simplified usage.

According to a first aspect of embodiments herein, the tool comprises a tubular body extending in an axial direction and having a first portion and a second portion and a cap nut surrounding the first portion of the tubular body. The cap nut is rotatable and axially translatable in relation to the tubular body. The tubular body comprises a hose fitting structure at the second portion of the tubular body. The cap nut and the tubular body are retained as one unit such that they are non-detachable from each other.

By the provision of the tubular body extending in an axial direction as a whole tube, the tool has same inner diameter through the whole air path to ensure a stable air flow such that the air flow behavior is improved. By retaining the cap nut and the tubular body as one unit, the three parts of the original tool have been consolidated into one unit and the tool doesn't need to be assembled before usage. That is the tool according to embodiments herein is assembly-free and ready to use, the usage of the tool is simplified. Further, the manufacturing process is also simplified as the tool is configured to be manufactured by 3D-printing as one unit during a single additive manufacturing process without supporting structures. That is the whole tool can be 3D printed as one piece and does not need any assembly process.

According to some embodiments herein, the cap nut may comprise internal threads at a first inside portion of the cap nut for connecting to the gearbox.

According to some embodiments herein, the tubular body may comprise a retaining structure at the first portion of the tubular body for retaining the cap nut and the tubular body as one unit such that they are non-detachable from each other.

According to some embodiments herein, the cap nut may comprise a first contact surface at a second inside portion of the cap nut, and the tubular body may comprise a corresponding second contact surface at a position of the first portion of the tubular body. The first and second contact surfaces are adapted to engage with each other. The first and second contact surfaces may have male-female fitting structures with any suitable shapes, such as protrusions and groves, convex and concave structures, threads etc., which are adapted to engage with each other.

By providing the first and second contact surfaces with structures adapted to engage with each other, the contact surface area between the cap nut and the tubular body is increased so that an anti-leak property of the tool is improved, and a better air-tight function is ensured.

According to some embodiments herein, the cap nut and/or the hose fitting structure may have a hollow structure.

According to some embodiments herein, the cap nut and/or the hose fitting structure may comprise strengthening ribs.

By the provision of hollow structure with or without strengthening ribs for the tool, the weight of the tool and corresponding cost for 3D printing the tool are reduced.

According to some embodiments herein, the tool may be made of stainless steel, tool steel or titanium alloy.

According to a second aspect of embodiments herein, the method comprises printing the whole tool by using a 3D-printing machine on a building plate starting from a first end of the tubular body and a first end of the cap nut and continuing up to the second end of the tubular body and separating the whole tool as one unit from the building plate. The tubular body and the cap nut are 3D-printed as one unit during a single manufacturing process. According to some embodiments herein, the optional internal threads of the cap nut, the optional hose fitting structure, the optional retaining structure of the tubular body, the optional contact surfaces with fitting structures and/or the optional strengthening ribs are directly 3D-printed during the same single manufacturing process, such that the whole tool is 3D-printed as one unit during the single manufacturing process.

By manufacturing the whole tool as one unit and printing directly all parts and internal structures using 3D-printing machine during one single manufacturing process, the manufacturing process for the tool is simplified compared to that of the original tool and a decrease in price can be expected. Further, the tool does not need assembly process before usage, the service maintenance time is therefore shortened. Due to the fact that the tool is directly 3D printed so there will be no change in inner channel diameter as exists in the original tool. This will improve the air flow stability during operation.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

In the drawings.

DETAILED DESCRIPTION

To simplify the usage, improve the air flow behavior and anti-leak property of the tool 30, a nipple-shaped assembly-free tool for maintenance of a gearbox in a vehicle is provided according to embodiments herein.

Three-dimension (3D) printing or additive manufacturing (AM) includes construction of a three-dimensional object from a computer-aided design (CAD) model or a digital 3D model. 3D printing or AM can be used for producing spare parts, prototypes etc. Products are manufactured layer by layer, close to their final shape, thereby reducing wastage. Materials used include, for example, metals, polymers, wood flour, biocompatible materials, sand and composites. 3D printing or AM paves a way for manufacturing on demand for many industries. Embodiments herein take the advantages of the 3D printing or AM. The nipple-shaped assembly-free tool according to embodiments herein consolidates three parts into one unit and can be additive manufactured by a single manufacturing process.

By manufacturing the whole tool as one unit and printing directly all parts and internal structures using 3D-printing machine during one single manufacturing process, the manufacturing process for the tool is simplified compared to that of the original tool and a decrease in price can be expected. Further, the tool does not need assembly process before usage, the usage of the tool is simplified, and the service maintenance time is therefore shortened. Due to the fact that the tool is directly 3D printed so there will be no change in inner channel diameter as exists in the original tool. This will improve the air flow stability during operation.

The nipple-shaped assembly-free tool according to embodiments herein can be applied in maintenance of gearboxes in heavy duty vehicles. Although the disclosure will be described with respect to a gearbox in a heavy duty truck, the disclosure is not restricted to this particular gearbox, but may also be used in other vehicles such as medium duty vehicles.

FIG. 3(a) shows a perspective view of a tool 100 according to embodiments herein seen from a certain angle and FIG. 3(b) shows a cross-section view of the tool 100, where the internal structures are shown. The tool 100 has a nipple shape and can be used for maintenance of a gearbox in a vehicle.

As shown in FIGS. 3(a) and (b), the tool 100 comprises a tubular body 110 extending in an axial A direction and having a first portion 111 with a first end 115 and a second portion 112 with a second end 116. As can be seen from FIG. 3(b), an inner diameter D of the tubular body 110 is constant through the whole channel extending in the axial direction A of the tubular body 110.

The tool 100 further comprises a cap nut 120 surrounding the first portion 111 of the tubular body 110. The cap nut 120 is rotatable and axially translatable in relation to the tubular body 110.

Figure 3:
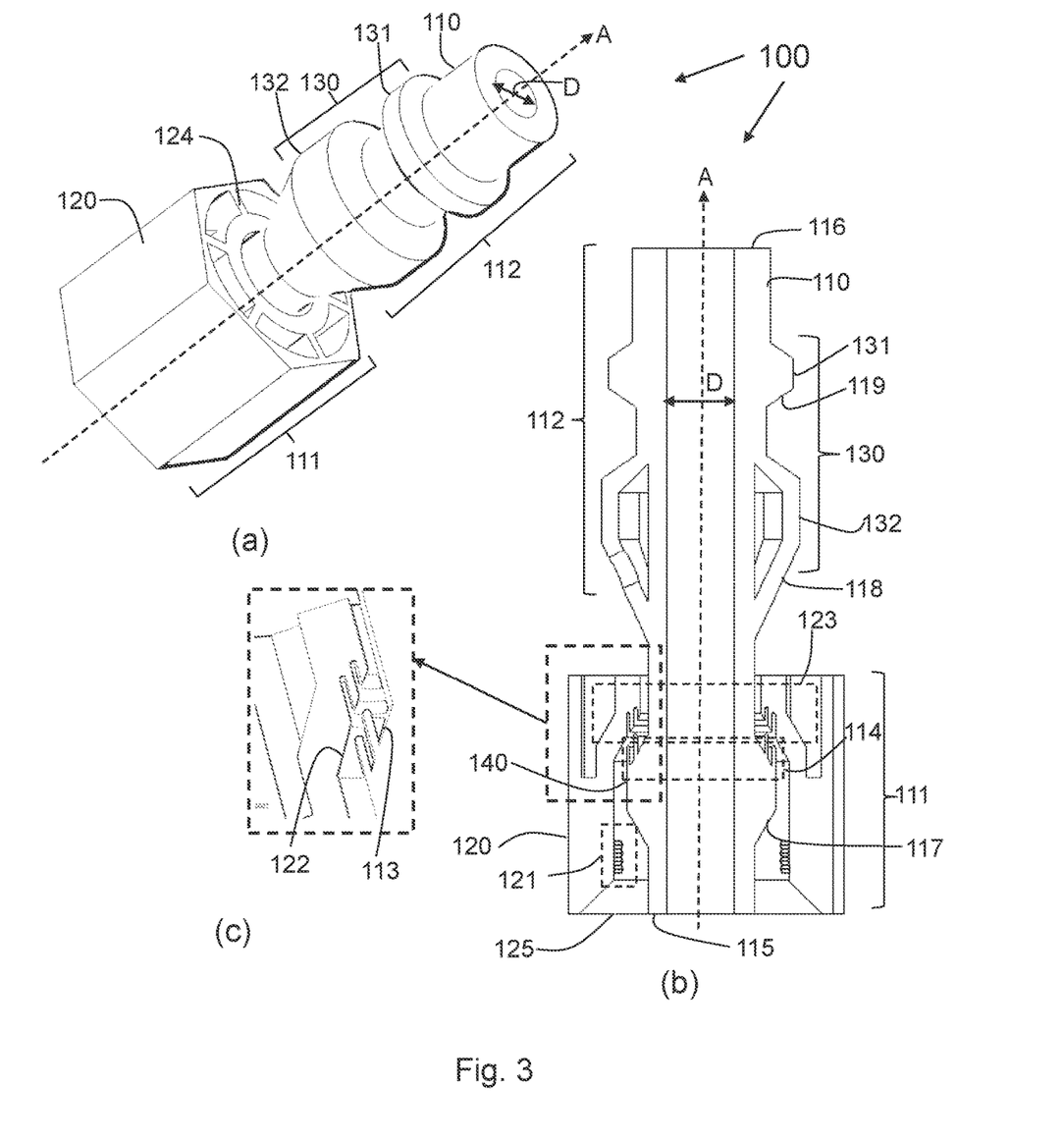

The tubular body 110 comprises a hose fitting structure 130 at the second portion 112 of the tubular body 110. The hose fitting structure 130 may be any shapes or structures, e.g., the hose fitting structure 130 may comprise a first protrusion 131 and a second protrusion 132 around the tubular body 110 as shown in FIG. 3 (a) and (b). The hose fitting structure 130 may locate at any position within the second portion 112 of the tubular body 110, e.g. 5-23 mm from the second end 116 of the tubular body 110.

The hose fitting structure 130 is for connecting to a tube with compressed air via a hose, as shown in FIG. 1, where the tool 30 is attached to a hose. The cap nut 120 is for connecting to the gearbox. The cap nut 120 and the tubular body 110 are retained as one unit such that they are non-detachable, or inseparable, or indivisible from each other. The tubular body 110 comprises a retaining structure 140 at the first portion 111 of the tubular body 110 for retaining the cap nut 120 and the tubular body 110 as one unit such that the cap nut 120 and the tubular body 110 are non-detachable from each other. The retaining structure 140 may locate at any position within the first portion 111 of the tubular body 110, e.g. 4-9 mm from the first end 115 of the tubular body 110. The retaining structure 140 may be any shape, e.g. an annular protrusion or bulge around the tubular body 110 as shown in FIG. 3(b).

As shown in FIG. 3(b), the cap nut 120 comprises internal threads at a first inside portion 121 of the cap nut 120 for connecting to the gearbox. The cap nut 120 further comprises a first contact surface 122 at a second inside portion 123 of the cap nut 120. The tubular body 110 comprises a corresponding second contact surface 113 at a position 114 within the first portion 111 of the tubular body 110. The first and second contact surfaces 122, 113 are adapted to engage with each other when the tool 100 is in use and connected to the gearbox. The second contact surface 113 may be a surface of the retaining structure 140.

To increase the contact surface area between the cap nut 120 and tubular body 110, the first and second contact surfaces 122, 113 may have several alternative embodiments having male-female fitting structures with any suitable shapes, such as protrusions and groves, convex and concave structures, threads etc., which are adapted to engage with each other.

According to some embodiments herein, one of the first and second contact surfaces 122, 113 may comprise at least one contact protrusion and the other of the first and second contact surfaces 122, 113 may comprise a corresponding at least one groove. The at least one contact protrusion and the at least one groove being adapted to engage with each other, as shown in FIG. 3(c), where the first contact surface 122 comprises one or more grooves, and the second contact surfaces 113 comprises one or more protrusions.

According to some embodiments herein, one of the first and second contact surfaces 122, 113 may comprise at least one convex structure and the other of the first and second contact surfaces 122, 113 may comprise a corresponding at least one concave structure. The at least one convex structure and the at least one concave structure being adapted to engage with each other.

According to some embodiments herein, the first and second contact surfaces 122, 113 may comprise thread which are adapted to contact and fit to each other.

When using the tool 100, the cup nut 120 is connected to a union e.g. the elbow union of the gearbox by rotating the cup nut 120. Although there may be slightly friction during the rotation due to the male-female fitting structures of the first and second contact surfaces 122, 113, the first and second contact surfaces 122, 113 are engaged or fitted with each other when the cup nut 120 has been connected to the union at the end of the rotation. The contact surface area between the cap nut 120 and tubular body 110 is increased due to male-female fitting structures compared to smooth surfaces on both the first and second contact surfaces 122, 113. Therefore, with any one of these alternative embodiments described above implemented to the first and second contact surfaces 122, 113, the contact surface area between the cap nut 120 and tubular body 110 will be increased such that a better air-tight function or better anti-leak property for the tool 100 is ensured and achieved compared to the original tool 30.

To decrease the weight and material of the tool, any one or both of the cap nut 120 and hose fitting structure 130 may have a hollow structure.

Figure 4:
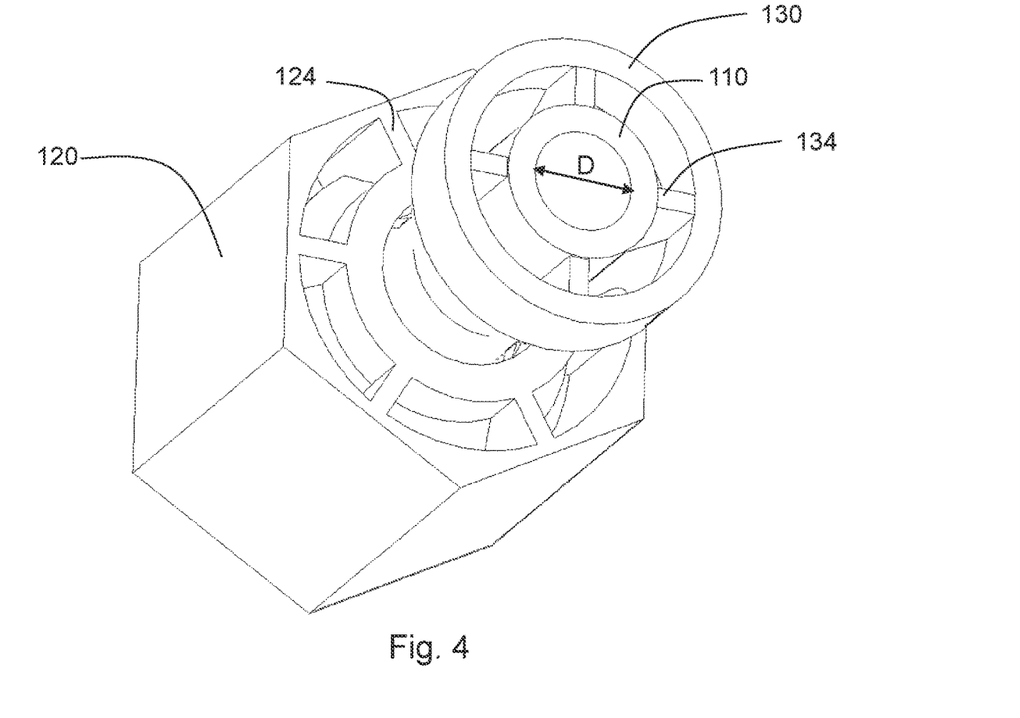
FIG. 4 is a perspective view of a tool according to embodiments herein.

To increase the strength of the cap nut 120 and hose fitting structure 130, the cap nut 120 and hose fitting structure 130 may comprise one or more strengthening ribs 124, 134, as shown in FIG. 4.

According to some embodiments herein, the tool 100 may be made of stainless steel, tool steel or titanium alloy according to embodiments herein.

Figure 5:
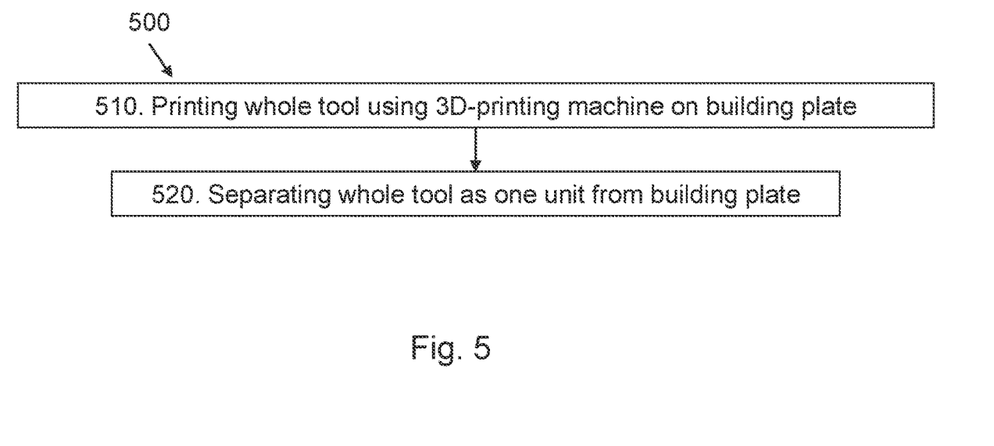
FIG. 5 is a flowchart of a method for manufacturing a tool according to embodiments herein.

The tool 100 may be manufactured by additive manufacturing, i.e. 3D printing. FIG. 5 shows a flow chart of a method 500 for manufacturing the tool 100. The method 500 comprises the following actions.

Action 510

Printing the whole tool 100 by using a 3D-printing machine on a building plate starting from the first end 115 of the tubular body 110 and the first end 125 of the cap nut 120 and continuing up to the second end 116 of the tubular body 110. The tubular body 110 and the cap nut 120 are 3D-printed as one unit during a single manufacturing process.

During the same single manufacturing process, the optional internal threads 121 of the cap nut 120, the optional hose fitting structure 130, the optional retaining structure 140 i.e. the protrusion structure 140, of the tubular body 110, the optional contact surfaces 122, 113 with fitting structures, such as protrusions and corresponding grooves, convex and concave structures, threads etc., and/or the optional strengthening ribs 124, 134 are directly 3D-printed such that the whole tool 100 is 3D-printed as one unit during one single manufacturing process.

As can be seen from FIG. 3(*b*), important face-down surfaces, e.g. surface 117 of the protrusion structure 140, surfaces 118, 119 of the hose fitting structure 130 on the tubular body 110, the first contact surface 122 of the cup nut 120 etc., all have an angle such that they can be printed layer by layer without extra support structures during 3D printing.

Action 520

Separating the whole tool 100 as one unit or a single piece from the building plate. The tool is ready to use without any post processing and assembly process.

Figure 6:
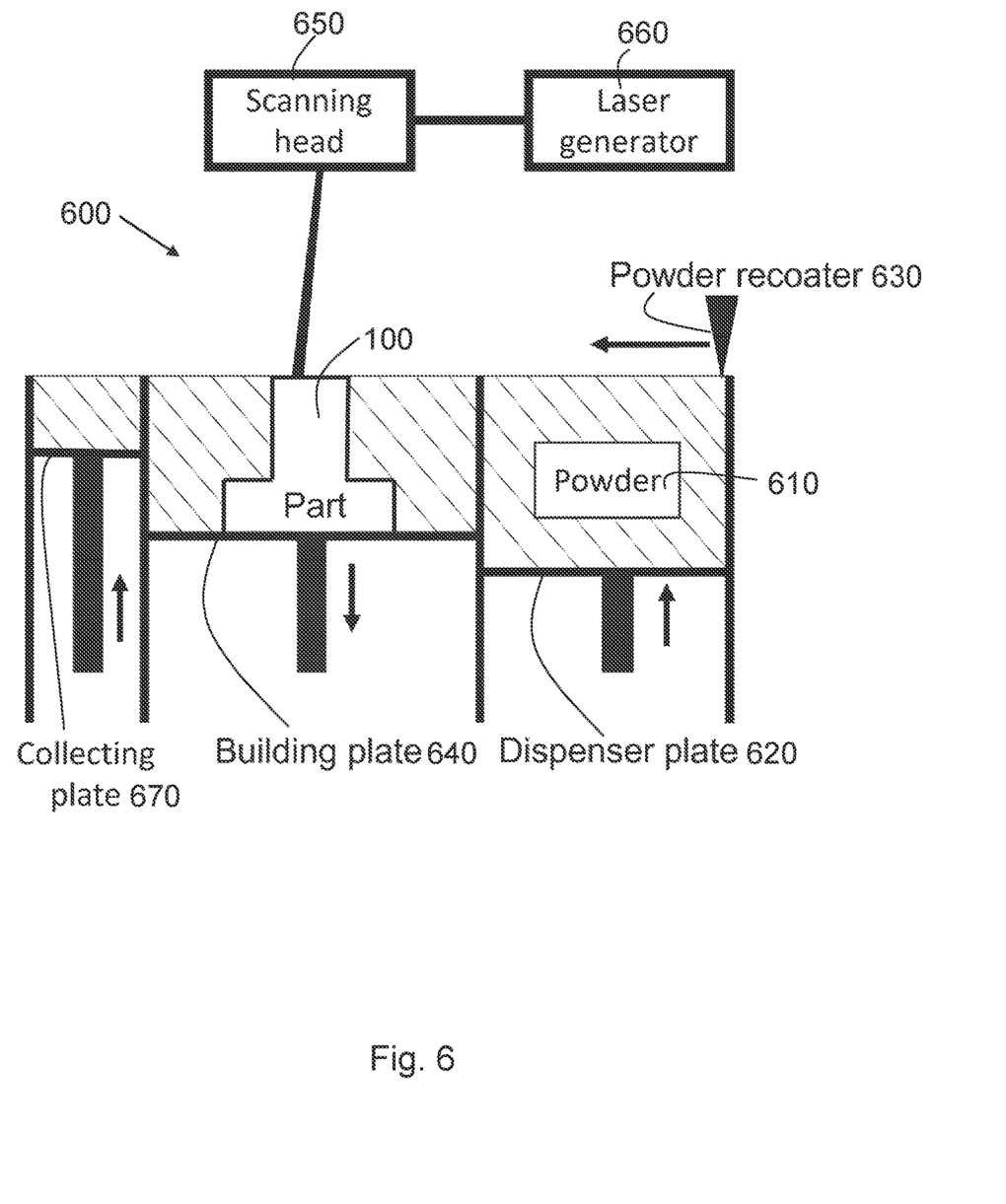
FIG. 6 is a simplified cross-section view of an example 3D printing machine.

FIG. 6 is a simplified cross-section view of an example 3D printing machine 600, which may be used to manufacture the tool 100 by Selective Laser Melting (SLM) process. During the SLM process, a product is formed by selectively melting successive layers of powder by the interaction of a laser beam. Upon irradiation, the powder material is heated and, if sufficient power is applied, melts and forms a liquid pool. Afterwards, the molten pool solidifies and cools down quickly, and the consolidated material starts to form the product. After the cross-section of a layer is scanned, the building platform is lowered by an amount equal to the layer thickness and a new layer of powder is deposited. This process is repeated until the product is completed.

This layer-by-layer process was first used to produce prototypes, but the trend is towards direct manufacture of components because of its ability to net-shape manufacture complex structures from a CAD model and a wide range of materials without the need of expensive tooling and machining so that the delay between design and manufacture is minimised.

As shown in FIG. 6, during the process, metal powder 610 in a dispenser plate 620 is heated close to its melting point and spread by a power recoater 630 on a building plate 640. A scanning head 650 connected to a laser generator 660 draws or scans a cross section of a part, e.g. the tool 100, into the powder material, i.e. the cross section of the first end 115 of the tubular body 110 and the first end 125 of the cap nut 120 are formed by the laser beam. After the cross-section of a layer is scanned, the building plate 640 is lowered corresponding to one layer thickness which is approximately 0.1 mm, after which the process is repeated until the 3D tool 100 is completed. A collecting plate 670 is used for collecting the rest of un-melted metal powder.

As the finishing is done together with the SLM, no additional finishing is required except from removing un-melted metal powder. This process produces objects with very good finish.

Another advantage of this process is that the powder is melted only locally by the laser and the rest of the powder can be recycled for further fabrication. The SLM may be used to selectively melt nickel-based superalloys, Ti-based alloys, Al-based alloys and Nb-based alloys to fabricate components and structures for automobile and aerospace application.

To summarize, advantages and improved performances of the tool 100 according to embodiments herein may include and not limited to the following:

- Providing a single piece assembly-free tool 100 manufactured by 3D printing with metal, e.g. stainless steel, tool steel or titanium alloy. By making the tool assembly-free, the service maintenance time will be shortened.
- The tool 100 is designed in a way that it can be 3D printed as one unit or one piece. The structures and shapes of the tool 100 is configured in such a way that there will be no need for support structure during printing which minimizes the post processing and reduces the cost.
- The tool 100 has simplified manufacturing process which avoids manufacturing different parts, i.e. three parts of the original tool can be printed as one unit during a single 3D printing process. No assembly structures such as screw or threads are needed as the original tool, e.g. the first and third parts of the original tool are integrated to one piece, i.e. the tubular body 110. Due to the fact that the whole tool 100 is directly 3D printed so there will be no change in inner channel diameter as exists in the original tool. This will improve the air flow stability during operation.
- The male-female fitting structures on the contact surfaces of the tubular body 110 and the cap nut 120 increase the contact surface area thereby ensure better anti-leak property for the tool 100. This kind of internal structures can be directly 3D printed and may not otherwise be achieved by conventional manufacturing.

The new tool 100 has a light-weighted structure, i.e. hollow structure with or without strengthening ribs which lights the weight more than 20% of the original tool. The cost for 3D printing the tool 100 may be reduced as smaller volume of metal will be used compared to the original tool.

After printing, the whole tool 100 can come off the build plate as one piece. The outer sub-part, i.e. the cup nut 120 can rotate with respect to the inner pipe, i.e. the tubular body 110. The original function of the original tool is fully filled by the new tool 100.

The threads 121 inside the cup nut 120 cannot be manufactured by any conventional methods since there will be no space for a threading tool. The threads instead are directly 3D printed based on the concept that the whole tool is manufactured as one piece.

It is to be understood that the present invention is not limited to the embodiments described above and illustrated in the drawings; rather, the skilled person will recognize that many changes and modifications may be made within the scope of the appended claims.

The invention claimed is:

1. A nipple-shaped assembly-free tool for maintenance of a gearbox in a vehicle, the tool comprising:
   a tubular body extending in an axial direction and having a first portion and a second portion; and
   a cap nut surrounding the first portion of the tubular body;
   the cap nut is rotatable and axially translatable in relation to the tubular body;
   wherein the tubular body comprises a hose fitting structure at the second portion of the tubular body, and wherein
   cap nut and the tubular body are retained as one unit such that they are non-detachable from each other; and
   the cap nut comprises an inwardly directed flange having a first inclined or conical contact surface at a second inside portion of the cap nut, and the tubular body comprises a corresponding second inclined or conical contact surface at a position of the first portion of the tubular body, wherein the first and second contact surfaces comprise male-female fitting structures adapted to engage with each other such that the contact surface area between the cap nut and the tubular body is increased.

2. The tool according to claim 1, wherein the tool is configured to be manufactured by 3D-printing as one unit during a single additive manufacturing process without supporting structures.

3. The tool according to claim 1, wherein an inner diameter of the tubular body is constant through a whole channel extending in the axial direction of the tubular body.

4. The tool according to claim 1, wherein the tubular body comprises a retaining structure at the first portion of the tubular body for retaining the cap nut and the tubular body as one unit such that the cap nut and the tubular body are non-detachable from each other.

5. The tool according to claim 1, wherein the cap nut comprises internal threads at a first inside portion of the cap nut.

6. The tool according to claim 1, wherein one of the first and second contact surfaces comprises at least one contact protrusion and the other of the first and second contact surfaces comprises a corresponding at least one groove, the at least one contact protrusion and the at least one groove being adapted to engage with each other.

7. The tool according to claim 1, wherein one of the first and second contact surfaces comprises at least one convex structure and the other of the first and second contact surfaces comprises a corresponding at least one concave structure, the at least one convex structure and the at least one concave structure being adapted to engage with each other.

8. The tool according to claim 1, wherein the first and second contact surfaces comprise threads which are adapted to engage with each other.

9. The tool according to claim 1, wherein the cap nut and/or the hose fitting structure has a hollow structure.

10. The tool according to claim 1, wherein the cap nut and/or the hose fitting structure comprises strengthening ribs.

11. The tool according to claim 1, wherein the tool is made of stainless steel, tool steel or titanium alloy.

12. A method for manufacturing the tool according to claim 1, the method comprising:
    printing the whole tool by using a 3D-printing machine on a building plate starting from a first end of the tubular body and a first end of the cap nut and continuing up to a second end of the tubular body, wherein the tubular body and the cap nut are 3D-printed as one unit during a single manufacturing process; and separating the whole tool as one unit from the building plate.

13. The method according to claim 12, wherein the internal threads of the cap nut, the hose fitting structure, the retaining structure of the tubular body, the contact surfaces and/or the strengthening ribs are directly 3D-printed during the same single manufacturing process, such that the whole tool is 3D-printed as one unit during the single manufacturing process.

* * * * *